Sept. 7, 1937.  C. W. RYERSON  2,092,719
VEHICLE JACKING STRUCTURE
Filed June 10, 1935   2 Sheets-Sheet 1

Creighton W. Ryerson, Inventor

By Beaman & Langford
Attorney

Sept. 7, 1937. C. W. RYERSON 2,092,719
VEHICLE JACKING STRUCTURE
Filed June 10, 1935 2 Sheets-Sheet 2

Inventor
Creighton W. Ryerson
By Beaman & Langford
Attorney

Patented Sept. 7, 1937

2,092,719

UNITED STATES PATENT OFFICE 2,092,719

VEHICLE JACKING STRUCTURE

Creighton W. Ryerson, Jackson, Mich., assignor to Ryerson & Haynes, Inc., Jackson, Mich., a corporation of Michigan Application June 10, 1935, Serial No. 25,827

7 Claims. (Cl. 280—150)

The present invention relates to improvements in jack and jacking attachment structures for automotive vehicles and constitutes an improvement over the patent to Stephen DeOrlow No. 1,994,984.

In applying a jack to the sprung structure of a vehicle, as disclosed in the above mentioned patent, to lift the unsprung structure through the spring, the weight of the unsprung structure particularly at the rear end of the vehicle is sufficient to cause considerable sagging before the running wheel is elevated. Heretofore means have been provided for limiting the sag but in each instance the axle has been directly supported by means rather complicated in operation or structure or both.

According to the present invention the height to which the sprung structure need be lifted to suspend the unsprung structure through the chassis springs is materially lessened by providing a jacking attachment which enables the jack to be applied to a sprung part of the vehicle structure yet in its action limits the sag of the chassis springs by a tensioning or retaining action, preferably applied at one end of the spring structure in the case of longitudinally extending semi-elliptical springs.

Thus one of the objects of the present invention is to provide jacking attachment structure for lifting a sprung portion of a vehicle and restraining the sagging of the chassis spring due to the weight of the unsprung portion.

Another object is to provide improvement in jack structure to be used in connection with jacking attachments of the aforesaid construction.

Figure 1:
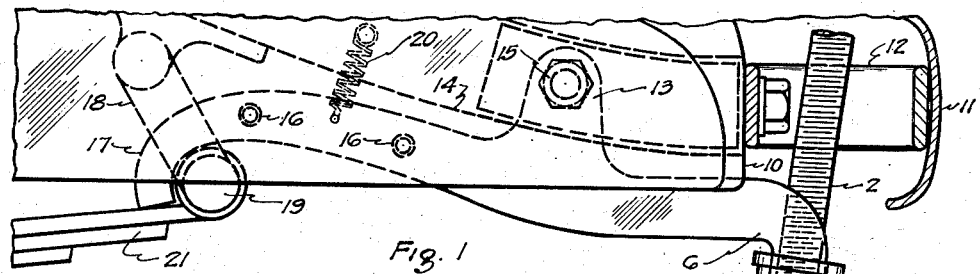
Figure 2:
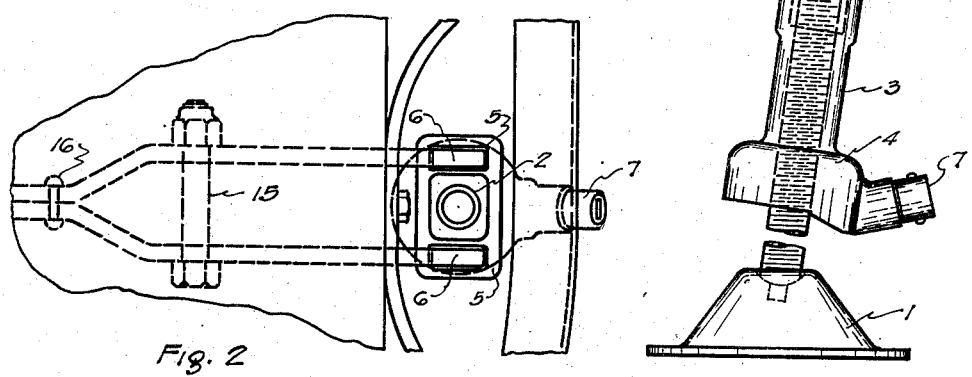
Figure 3:
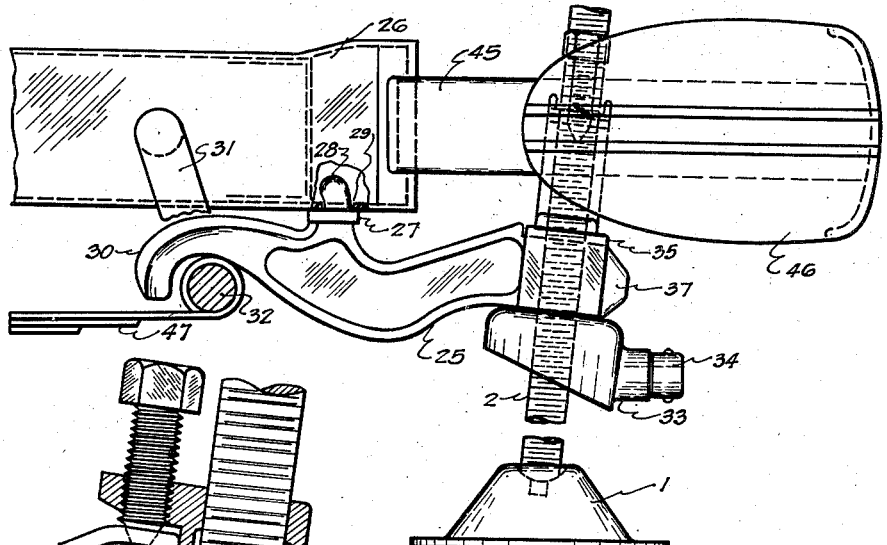
Figure 4:
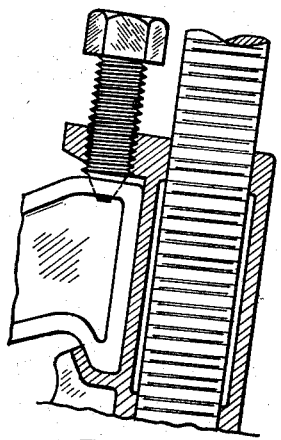
Figure 6:
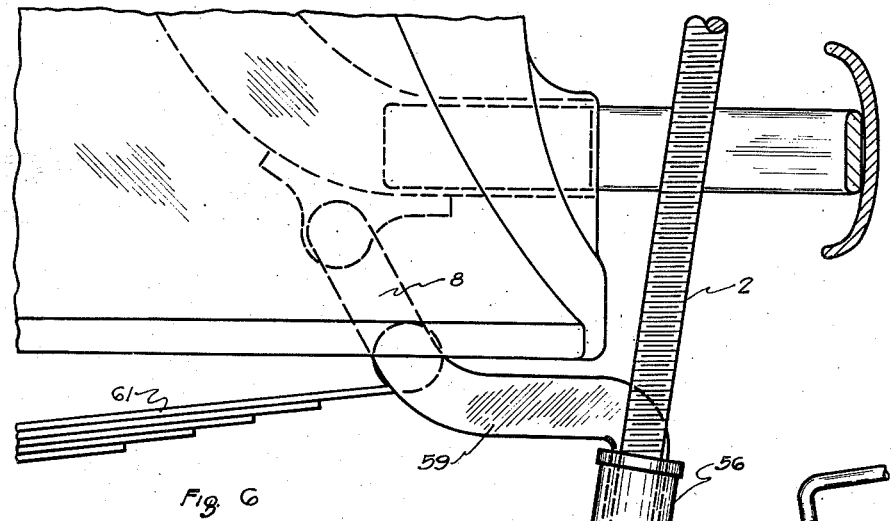
Figure 5:
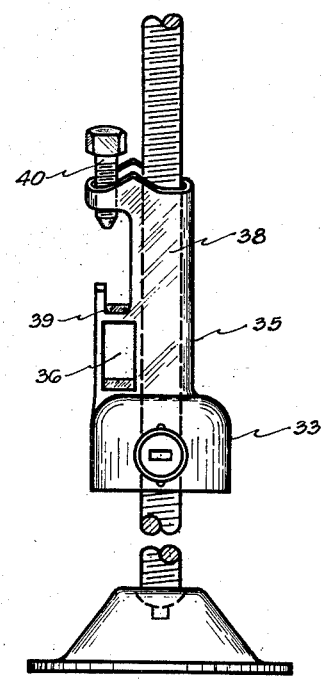
Figure 7:
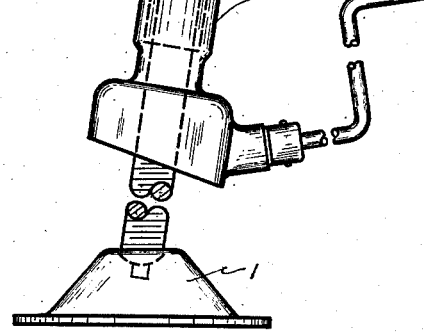

These and other objects will be apparent from the following specification when taken with the accompanying drawings, in which Fig. 1 is a side elevation of one embodiment of the invention, Fig. 2 is a partial view of Fig. 1 taken in a direction substantially perpendicular to the pivoted arm, Fig. 3 is an elevation of another embodiment of the invention, Fig. 4 is a partial elevation of a modification of Fig. 3, Fig. 5 is a side elevation of the jack of Fig. 3, Fig. 6 is an elevation of still another embodiment of the invention, and Fig. 7 is a partial side elevation of Fig. 6.

Referring particularly to Fig. 1, the jack is provided with a base 1 receiving the thrust bar 2. The thrust bar 2 is seated in the base 1 for oscillatory movement, and may be seated in a manner such as disclosed in the aforesaid patent. The thrust bar 2 is threaded and has mounted on its threads a lifting portion 3, having a casing 4, housing actuating mechanism, and a socket 5 for receiving the portions 6 of the jacking attachment pivoted to the vehicle frame. A connection 7 is provided for receiving a suitable crank for operating the actuating mechanism within the housing 4 and thus raising or lowering the lifting portion 3 on the thrust bar 2.

Mechanism for raising and lowering the lifting portion 3 is also disclosed in the aforesaid patent and may be used in the present jack. The socket 5 consists of two recesses 5' and 5" on either side of the thrust bar 2. The jack attachment portion 6 comprises two arms spaced at the outer end arranged to be received within the two recesses of the socket 5, respectively, as particularly shown in Fig. 2.

The socket 5 preferably extends in a direction parallel to the axis of the thrust bar 2, while the portions 6 are preferably disposed at an angle to the horizontal. As a result, when the portions 6 are telescopically received in the socket 5, the thrust bar 2 is disposed at an angle to the horizontal. The advantage of such an arrangement is to overcome any tendency of the vehicle to roll away from the jack. As should be readily understood, when the sprung portion of a vehicle is jacked to a sufficient height to lift a running wheel from the ground, if the initial position of the thrust bar is vertical, the thrust bar will lean toward the vehicle. In this position there is a tendency of the vehicle to roll away from the jack. If, however, at the beginning of the jacking operation the thrust bar is inclined away from the vehicle any tendency of the vehicle to roll away from the jack is overcome. It will be obvious that the same result obtained by inclining portions 6 of the jacking attachment may be obtained by inclining the socket 5 or by inclining both the jack attachment portions 6 and the socket 5. With the jack in load supporting position, the thrust bar 2 preferably extends between the body 10 of the vehicle and the bumper bar 11, the latter being suitably connected to the body 10 by a bumper bracket 12.

The portions 6 are in the form of levers pivotally supported midway between their ends by the offset tabs 13 pivotally supported in the frame 14 by a pin 15. The two forward arms of the portions 6 inwardly of the vehicle from the pivotal point thereof are bent toward each other and riveted together by rivets 16, as shown in Fig. 2 to provide an inwardly extending hook-shaped arm 17. The hook-shaped arm is arranged to cooperate with the spring shackle 18 in such a manner that it hooks over lower shackle bolt 19. A spring 20 connects the inwardly extending hook-shaped arm 17 with the vehicle frame and when the arm 17 is not in use prevents it from interfering with the normal operation of the spring 21 and its shackle 18 and prevents any rattle.

The operation of the embodiment of the invention disclosed in Figs. 1 and 2 is as follows: When it is desired to jack up a wheel of the vehicle, the jack is placed beneath the portions 6, and the lifting portion 3 is moved upwardly by rotating the connection 7 in a suitable manner, as by a detachable crank. As the thrust bar 2 is oscillatable on its base, it may be tilted until the sockets 5 are in alignment with the portions 6. The lifting portion is then moved upwardly, the portions 6 being telescopically received by the sockets 5 until the wheel is raised from the ground. The initial lifting of the jack carries the portions 6 to pivot about the pin 15, bringing the inwardly extending arm 17 into engagement with the shackle bolt 19. As the sprung structure is lifted, the arm 17 not only prevents inward movement of the shackle 18, but may be designed to also slightly move it outwardly toward the jack. Consequently the sagging of the spring 21 is restrained not only by the preventing of inward movement of the shackle, but also by the actual spring tensioning action resulting from moving the shackle outwardly. However, it is not essential that the shackle be moved outwardly. In practicing the present invention, the arm 17 can function merely as an abutment or stop.

Figs. 3, 4 and 5 disclose another embodiment of the invention. In this embodiment the jacking attachment portion 25 is detachably secured to the frame 26 of the vehicle. The portion 25 is provided with a shoulder 27, from which projects a pin 28 in operative position being fitted into a hole 29 in the frame 26. The portion 25 is provided with an inwardly extending hook shaped arm 30 cooperating with the shackle 31 and shackle bolt 32 in the same manner as the embodiment of Figs. 1 and 2.

The jack shown in Fig. 3 comprises a base 1 and threaded thrust bar 2 having a housing 33 containing a suitable actuating mechanism, and a connection 34 for receiving a crank or other equivalent device for operating the actuating mechanism. The lifting portion 35 of the jack is movable with the housing 33 and comprises a slot 36 which is preferably rectangular and holds the correspondingly shaped projection 37 on the outer end of the attachment portion 25.

The operation of the embodiment disclosed in Figs. 3 and 5 is as follows: The jacking attachment 25 is first positioned with the pin 28 engaging with the vehicle frame and the hook-shaped arm 30 engaging the spring shackle 31. The jack is then connected with the attachment 25 by passing the projection 37 through the slot 36. Preferably the jack and jacking atttachment is so designed to permit the jack to be received between the frame 26 and the bumper bar 46 carried by the mounting bar 45. With the weight of the vehicle supported through the spring 47, the shackle 31 will assume the position shown in Fig. 3. Operation of the jack to elevate the housing 35 brings the arm 30 into stressed engagement with the shackle 31 and the hooked shape of the arm 30 prevents the shackle 31 from swinging to the left to limit the sag of the spring 47 as the sprung structure is lifted.

The necessity of supporting or limiting the sag of the unsprung structure while jacking through the spring structure is greatest at the rear end of the vehicle as the unsprung structure at the rear is heavier than at the front end. For this reason the jacking attachment may be dispensed with in jacking the front end of the vehicle and jacks shown in Figs. 3 and 5 are designed to be attached directly to the bumper structure or other suitable structure at the front end in a manner similar to that disclosed in the aforesaid patent. As illustrated the housing 33 and lifting portion 35 in which the slot 36 is defined are integral. Integral with the upper part of the portion 35 is defined an attachment portion comprising a ledge 39 adapted to receive a bar carried by the spring structure, such as a part of the bumper structure, and a screw 40 for holding the bar upon the ledge 39 in a manner similar to that disclosed in the aforesaid patent. Obviously, the attachment portion may take other forms and I do not wish to be limited to the structure illustrated.

Fig. 4 discloses a modified jacking attachment portion 48 corresponding to and functioning, as far as engaging the shackle 31 is concerned, like the portion 25 of Fig. 3. It differs in that its outer end 49 is provided with a depending flange 50 for seating on a ledge 51 and a depression 52 for receiving a conical nose screw 53 of the attachment portion 54 of the jack 55, which may be similar to the jack disclosed in Fig. 5 except the slot 36 is omitted and the attachment portion 54 serves the double function of being used in connection with the jacking attachment portion 48 or directly applied to a part of the vehicle structure.

Another embodiment of the invention is disclosed in Figs. 6 and 7. In that embodiment the jack is somewhat similar to that in the embodiment of Figs. 1 and 2, but differs in that the lifting portion 56 has a single recessed socket 57. In this modification, instead of having a lever or arm engaging the spring shackle, the spring shackle 58 is provided with an extension 59, the extension comprising the jacking attachment portion, and is telescopically received in the socket 57. The operation of this modification is such that as the lifting portion 56 is moved upwardly the shackle 58 is pivoted outwardly about its upper pivotal point, tensioning the spring 60 and consequently restraining the tendency of the spring 61 to sag.

In practice, especially with light vehicles, the present invention need be applied only to the rear springs of automotive vehicles for the reason that the great weight of the banjo housing and rear axle principally contribute to the undesirable sag on lifting the sprung portion of the vehicle. However, it is not intended that this invention be limited to merely the rear of automotive vehicles, for obviously it may be used wherever desired.

Having thus described my invention, what I desire to secure by Letters Patent and claim is:

1. In combination with a vehicle having a spring structure supporting a sprung portion therefrom, an arm engageable at one end with the spring structure for longitudinally tensioning the same, midway between its ends engaging the sprung portion, and at the other end arranged for being lifted by jacking means, the arm being characterized by the fact that it restrains the spring structure against vertical extension during lifting of the sprung portion.

2. In combination with a vehicle having a semi-elliptical spring supporting a sprung portion therefrom, said spring being mounted on shackles pivoted to the sprung portion, means connected to the sprung portion for cooperating with one of the shackles to restrain sagging of said spring during the lifting of the sprung portion, and means to maintain said first named means in engagement with said shackle during the lifting of the sprung portion.

3. In combination with a vehicle having a spring structure supporting a sprung portion therefrom, said spring structure including shackles pivoted to the sprung portion, means connected to the sprung portion engageable with one of the shackles to restrain the same against inward movement, means resiliently urging said first named means out of engagement with the shackle, and means engageable with said first named means for maintaining the same in engagement with the shackle during the lifting of the sprung portion of the vehicle.

4. In combination with a vehicle having a spring structure supporting a sprung portion therefrom, said spring structure including shackles, a hooked arm hooked to and extending from said shackle, means spaced from said shackle supporting said arm from said sprung portion, said arm being arranged for engagement by a lifting jack for lifting the sprung portion of the vehicle therethrough, whereby when said sprung portion is lifted sagging of said spring structure is restrained.

5. In combination with a vehicle having a semi-elliptical spring supporting a sprung portion therefrom, a shackle supporting at least one end of the spring, and a hooked arm hooked to and extending from said shackle, means spaced from said shackle supporting said arm from said sprung portion, said arm being adapted to be engaged by a lifting jack for lifting the sprung portion of the vehicle, whereby when said sprung portion is lifted, inward movement of said shackle is restrained.

6. A device of the character described comprising a lever arranged for detachable connection to the sprung portion of a vehicle having a sprung portion, the sprung portion being mounted on a semi-elliptical spring structure, said lever having at one end a hooked portion arranged for connection with one end of said spring structure to longitudinally tension the same to restrain lateral movement thereof during lifting of the sprung portion, means connected to said lever for connection to said sprung portion to normally maintain said hooked portion out of engagement with said spring structure, and means at the other end of said lever for receiving a lifting means for lifting the sprung portion and for maintaining said hooked end in engagement with said spring structure.

7. In combination with a vehicle having a spring structure supporting a sprung portion therefrom, an arm having a hook at one end thereof, said hook being engageable with said spring structure for longitudinally tensioning the same, said arm having placed between its ends means for engaging the sprung portion and at the other end being arranged for being lifted by jacking means, the arm being characterized by the fact that it restrains the spring structure against vertical extension during lifting of the sprung portion.

CREIGHTON W. RYERSON.